Nov. 30, 1937.   J. RENTLER   2,100,598
IDENTIFICATION DEVICE FOR AUTOMOBILES
Filed Feb. 2, 1937   3 Sheets-Sheet 1
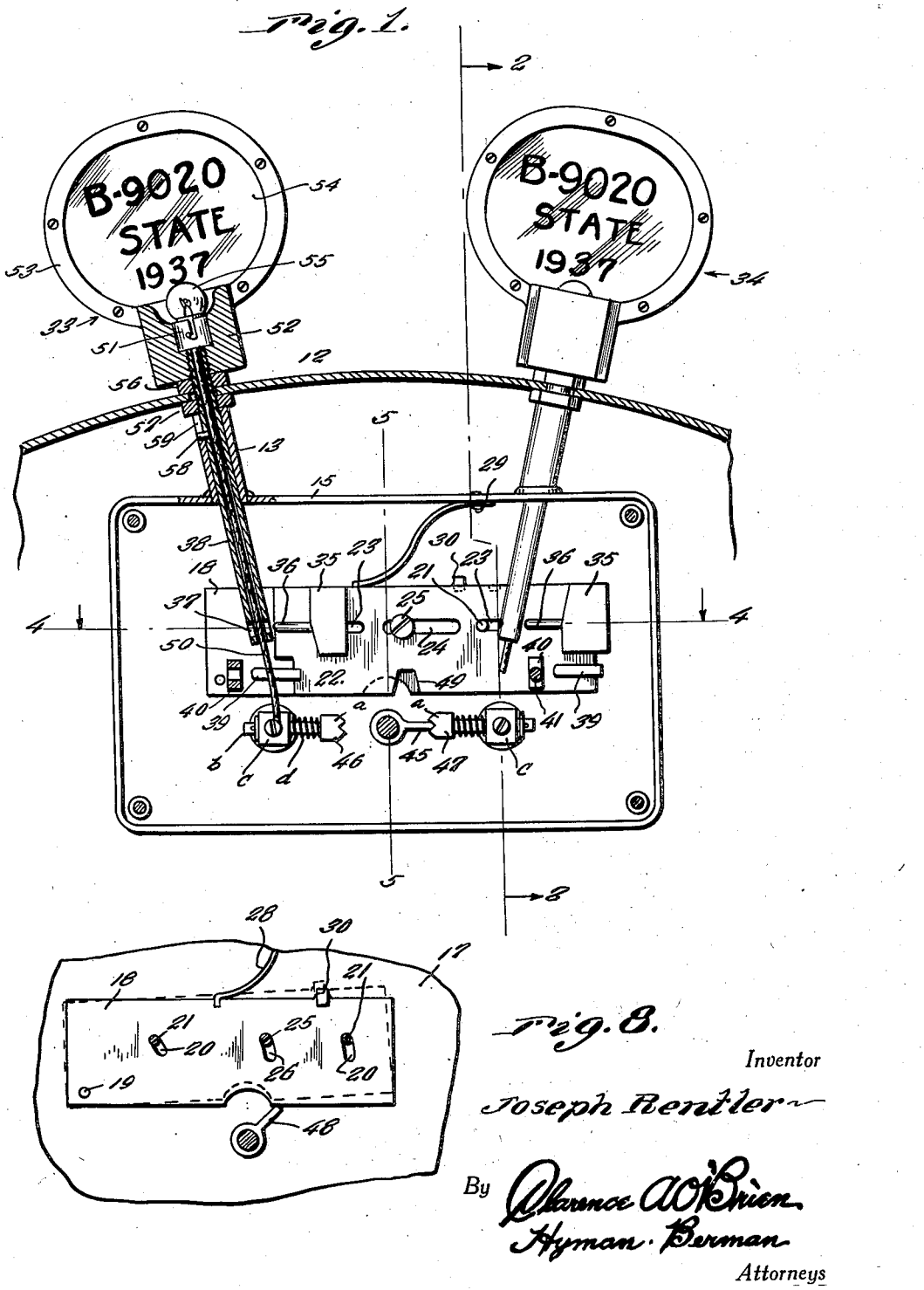
Inventor
Joseph Rentler
By *Clarence A. O'Brien*
   *Hyman Berman*
                Attorneys Nov. 30, 1937.   J. RENTLER   2,100,598
IDENTIFICATION DEVICE FOR AUTOMOBILES
Filed Feb. 2, 1937   3 Sheets-Sheet 2
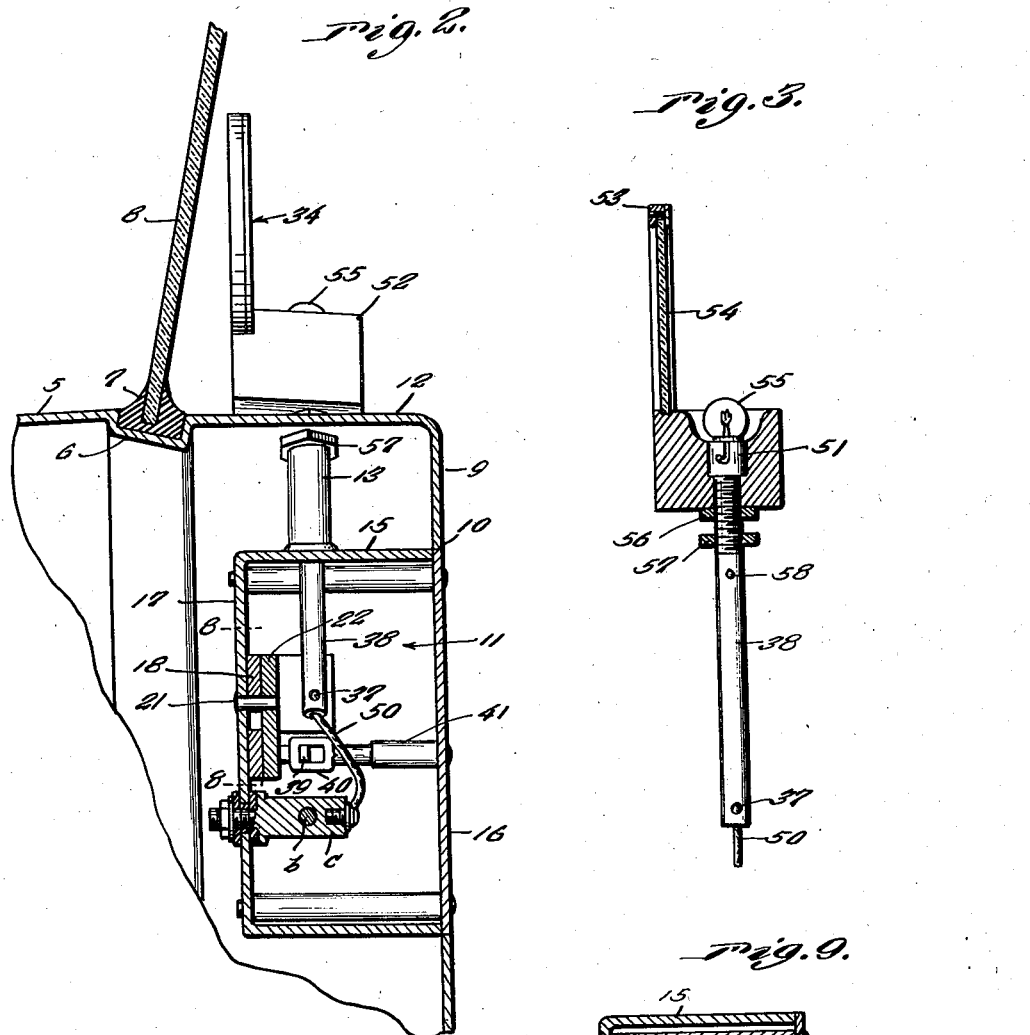
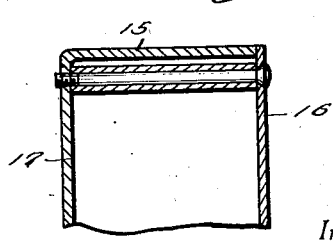
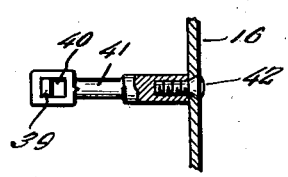
Inventor
Joseph Rentler
By Clarence A. O'Brien
Hyman Berman
Attorneys Nov. 30, 1937.   J. RENTLER   2,100,598
IDENTIFICATION DEVICE FOR AUTOMOBILES
Filed Feb. 2, 1937    3 Sheets-Sheet 3
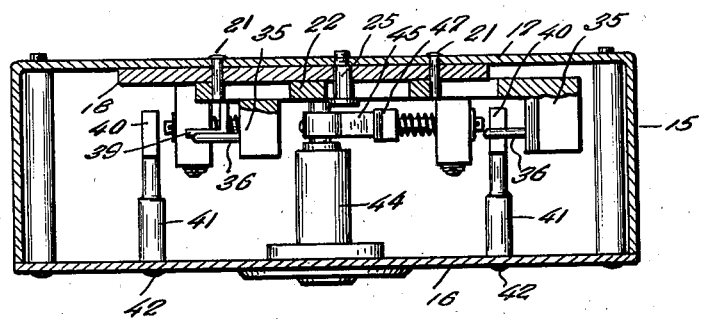
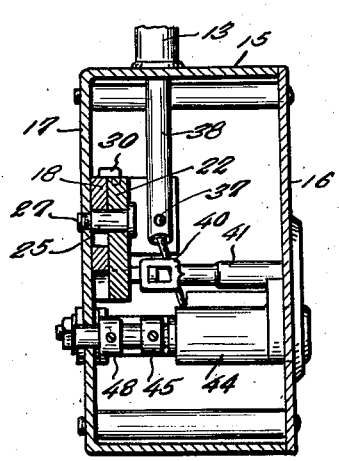
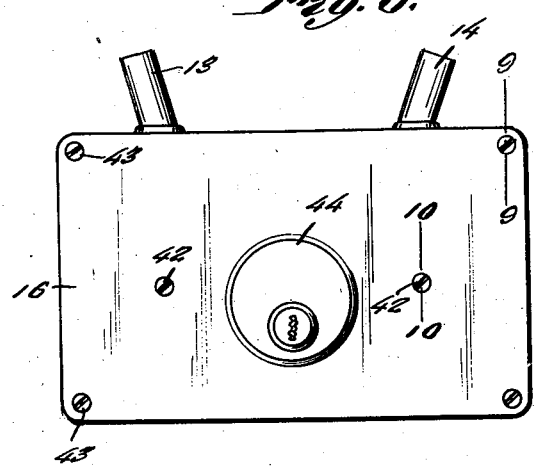
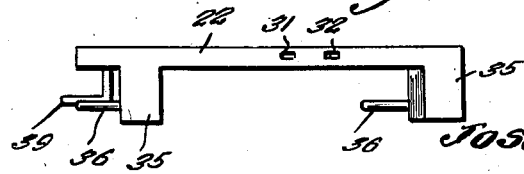
Inventor
Joseph Rentler
By Clarence A. O'Brien
Hyman Berman
Attorneys Patented Nov. 30, 1937

2,100,598

UNITED STATES PATENT OFFICE 2,100,598

IDENTIFICATION DEVICE FOR AUTOMOBILES

Joseph Rentler, Columbus, Ohio

Application February 2, 1937, Serial No. 123,676

3 Claims. (Cl. 40—2.2)

This invention relates to new and useful improvements in identification means for automobiles, the principal object being to provide identifying means for the authorized user of an automobile which will be illuminated when the ignition circuit is closed and which will bear the license plate number to the end that in the event the ignition switch is wired around so that the engine is started, unless the ignition tag is illuminated, indication will be given to police and other interested parties that the automobile is being used by an unauthorized person.

Another important object of the invention is to provide improved driver identification means for automobiles whereby the owner and another authorized person having a key to the ignition switch can control the ignition circuit and drive the automobile only while his or her identification tag is illuminated.

Various other important objects and advantages in regard to positive acting parts and foolproofness will become apparent to the reader of the following specification.

In the drawings:—

Figure 1 represents a fragmentary vertical sectional view taken on an irregular vertical plane.

Figure 2 is a fragmentary vertical sectional view taken substantially on the line 2—2 of Figure 1.

Figure 3 is a vertical sectional view through one of the identification tag assemblies.

Figure 4 is a horizontal sectional view on the line 4—4 of Figure 1.

Figure 5 is a vertical sectional view taken substantially on the line 5—5 of Figure 1.

Figure 6 is a front elevational view of the ignition switch box with the identification tag assemblies removed.

Figure 7 is a top plan view of the slide plate of the lock.

Figure 8 is a sectional view taken substantially on the line 8—8 of Figure 2, showing the rockable plate.

Figure 9 is a fragmentary enlarged detailed sectional view on the line 9—9 of Figure 6.

Figure 10 is a fragmentary sectional view taken substantially on the line 10—10 of Figure 6.

Referring to the drawings wherein like numerals designate like parts, it can be seen in Figure 2 that numeral 5 represents the usual cowl portion of an automobile body which is usually grooved as at 6 to receive the frame portion 7 of the windshield 8. This cowl portion generally extends inwardly of the windshield 8 and is formed downwardly as at 9, its inner end to form an instrument board. The portion 9 is provided with a rectangular-shaped opening 10 therein for receiving the ignition lock mechanism generally referred to by numeral 11. The inner portion 12 of the cowl is provided with a pair of openings for receiving the upstanding diverged tubes 13—14 extending upwardly from the switch box 15.

The front of this box 15 is provided with a cover plate 16 which fills the opening 10 in the instrument panel 9.

The back wall 17 of the box 15 has a rockable rectangular-shaped plate 18 rockably secured thereto by the pivot member 19, the same having a pair of arcuate-shaped slots 20—20 for receiving the pins 21—21 projecting from the rear wall 17. Numeral 22 represents a slide plate operating against the rockable plate 18, this slide plate 22 having a pair of longitudinally extending slots 23—23 for receiving the adjacent ends of the pin 21 and also a centrally located longitudinally extending slot 24 through which the smooth shank portion of the screw 25 extends. This smooth shank portion of the screw 25 also extends through the arcuate-shaped slot 26 in the rockable plate 18 and is threaded into the back wall 17 of the box 15 as at 27.

A strip spring 28 has its upper end anchored as at 28 to the top of the box 15 while its lower free end bears against the upper edge of the plate 18 for maintaining the same urged downwardly with its hook member 30 disposed into one or the other of the two openings 31—32 in the upper edge of the slide plate 22. This hook member 30 does serve to retain the lock plate 22 in a position maintaining the identifying tag assemblies generally referred to by numerals 33—34 either locked or unlocked with respect to the lock mechanism 11.

As is clearly shown in Figures 1 and 7, the plate 22 is provided with a pair of block formations 35—35 thereon each having a laterally extending pin 36 slidable through the openings 37 in the adjacent ends of the tubes 38 of the assemblies 33—34, so that when the hook member 30 is engaged again to the recess 31 the pins 36 are removed from the tube 38 so that if desired the identification assemblies can be changed. However, when the hook member 30 is engaged in the recess 32, the pins 36 are disposed through the openings 37 of the tube 38, making it impossible to remove the assemblies 33—34.

Furthermore, the slide plate 22 is provided with a pair of pin members 39—39 which engage into the eyes 40 on the inner ends of the arms 41 which are secured to the inner side of the cover plate 16 by screws 42. Thus the cover plate is prevented from being removed when the hook member 30 is engaged into the recess 32. Additional screws 43 are provided and are readily removable, for securing the cover plate 16 to the box proper 15.

A suitable tumbler type lock 44 of the key operated type is carried by the cover plate 16, the shaft of which has a contact lug 45 for engagement with the contacts 46—47 and also a lug 48 (see Figure 8) operative in the notch 49 of the slide plate 22 for operating the said slide plate and simultaneously lifting the rockable plate 18.

The contacts 46—47 are in the form of head members $a$, notched to receive the contact lug 45 and each has a shank $b$ slidable through a post $c$ and between this post and the head $a$ is a coiled compressible spring $d$ which is adapted to be compressed when the head is engaged by the lug 45. Each of the posts $c$ has a threaded shank disposed through the rear wall 18 and suitably insulated therefrom serving as a binding post for electrical connection.

Extending from each of the posts $c$ is a conductor wire 50 extending through the corresponding tube 38 to the lamp socket 51 in the pocket of the corresponding identification assembly block 52 from which rises the frame 53 having the pane 54 therein onto which light from the bulb 55 in the corresponding socket 51 can show.

The frame 53 is preferably of sectional construction with the sections secured permanently together by mutilated screws or the like, so that the pane cannot be removed. Obviously, when one of the units 33 or 34 must be removed, its corresponding conductor must be detached, and this can only take place after the box has been opened.

To distinguish from the owner's assembly and the other assembly 34 which can be used by some other authorized person such as the owner's wife, it is preferable that, for instance, the pane 54 have a dark background and light reference characters, while the pane of the assemblies 34 have a light background and dark characters. Thus, when the assembly 34 is illuminated, police or other interested parties will know that while the car is being driven by an authorized person it is not being driven by the owner.

Referring again to the assembly 33 shown in Figure 1, it can be seen that the upper end of the tube 38 is threaded into the block 52 and that the upper portion of the tube 38 is provided with threads for accommodating the jamb nuts 56—57, one above and one below the cowl 12.

As is shown in Figure 3, the upper portion of the tube 38 is provided with a laterally disposed pin 58 which engages into the bayonet slot 59 of the corresponding tube 13 on the box 15. Thus when the pin 36 on the slide plate 22 is disengaged from the lower end of the tube 38, the jamb nuts 56—57 can be loosened and the tube 38 worked loose from the tube 13 by disengaging the pin 58 from the bayonet slot 59. Thus the license panes 54 can be changed from time to time to agree with new issues of license tags.

It will be observed, that whenever the switch 5 assembly is wired around to complete the ignition circuit, neither one of the bulbs 55 will be energized and a car being driven without one or the other of the panes 54 illuminated will be regarded as a car driven by an unauthorized person.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

1. In combination, an ignition lock including a movable latch member, a box structure having a closure with which the latch member is engageable to hold the closure in closed position, a license tag assembly, said assembly provided with a portion projecting into the box, said latch member being engageable with the portion of the assembly projecting into the box to prevent detachment of the assembly from the box.

2. In combination, an ignition lock including a movable latch member, a box structure having a closure with which the latch member is engageable to hold the closure in closed position, a license tag assembly, said assembly provided with a portion projecting into the box, said latch member being engageable with the portion of the assembly projecting into the box to prevent detachment of the assembly from the box, a contact mounted in the box, illuminating means on the assembly, a conductor between the contact and the illuminating means, said lock including a swingable member engageable with the contact when the lock is in locked position, and a source of current connected with the said swingable member.

3. In combination, an ignition lock including a slidable latch member, a box structure in which the lock and latch member are located, a pair of license tag assemblies each including a tubular post, said tubular posts extending into the box-like structure, said latch member being engageable with the inner ends of the tubular members to prevent displacement of the assemblies from the box-like structure, illuminating means on the assemblies, conductors extending from the illuminating means through the tubular posts, contacts in the box-like structure to which the conductors are connected, and a rotatable member carried by the lock and engageable with one or the other of the said contacts, said rotatable member being adapted to be connected with a suitable source of current.

JOSEPH RENTLER.